Feb. 24, 1942.  R. SCHIFF  2,274,169
MULTIPLE SPOT WELDING
Filed Jan. 22, 1940
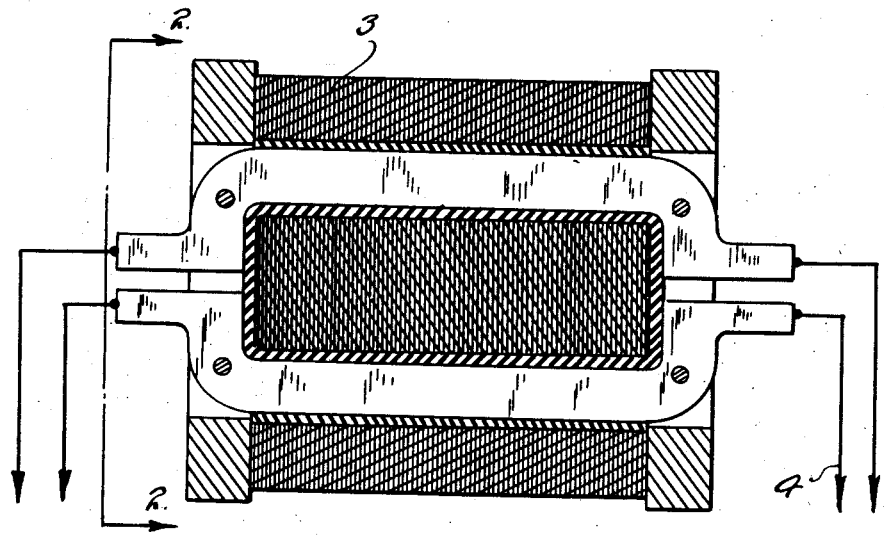
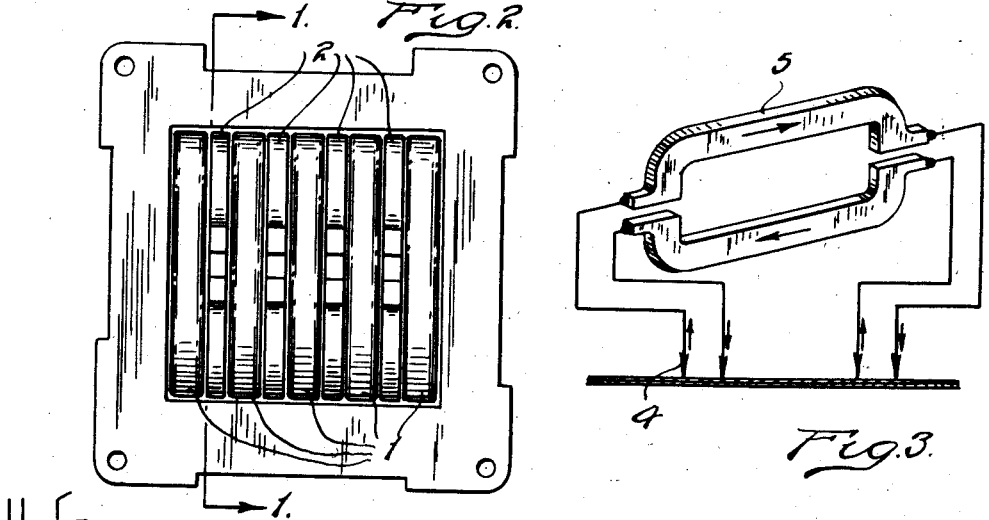
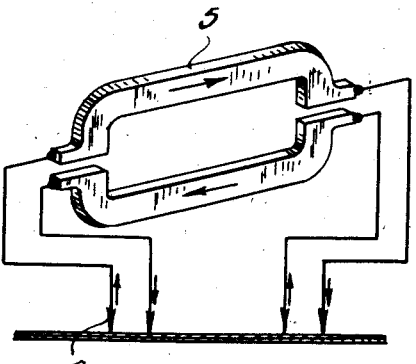
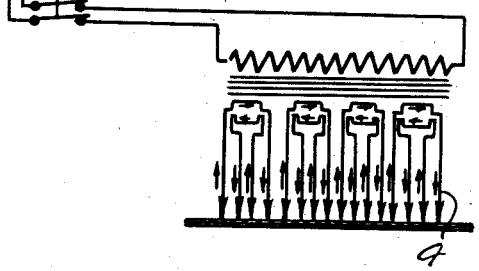
INVENTOR.
ROBERT SCHIFF.
BY Barnes, Kisselle, Laughlin & Raisch
ATTORNEYS.

Patented Feb. 24, 1942

2,274,169

UNITED STATES PATENT OFFICE 2,274,169

MULTIPLE SPOT WELDING

Robert Schiff, Detroit, Mich., assignor to General Motors Corporation, Detroit, Mich., a corporation of Delaware Application January 22, 1940, Serial No. 314,955

2 Claims. (Cl. 171—97)

This invention relates to welding and more particularly to spot welding with a large number of electrodes.

It has been found desirable to spot weld with a large gang of spot welding electrodes which are all in contact with the work. Where forty or fifty electrodes are used, these cannot be simultaneously energized efficiently at one time. It has been necessary to successively energize the electrodes individually or in groups.

One arrangement is to successively energize groups of electrodes. The members of one group are all connected with one transformer. The transformers are successively energized by successively energizing the primaries of these transformers. Such a method of welding is described and claimed in the Biederman and Harder application, Serial No. 282,640, filed July 3, 1939.

Transformers are ordinarily built with a suitable number of primary turns to one secondary turn to get the proper ratio and alteration of the voltage and amperage. The ends of the secondary turns are connected one to each electrode. I have discovered that, by splitting the secondary turns and connecting the electrodes to the split ends, I can multiply the number of electrodes which can be connected with a transformer of a given size without materially increasing the power consumption, thereby saving, first, in the number of transformers required for a given battery of electrodes, second, the transformer space required in a given machine and, third, the amount of power required to operate the electrodes. This will more fully appear hereinafter.

In the drawing:

Fig. 1 is a vertical section of the transformer.

Fig. 2 is an end view.

Fig. 3 is a diagrammatic view of one split secondary turn.

Fig. 4 is a diagrammatic view of one transformer which has four split secondary turns.

The primary is designated 1 and the coils (five in number), which are part of one large coil, are packed between the four secondary turns designated 2. Suitable laminated sheets 3 are provided in the transformer.

In place of two electrodes connected with each secondary turn, I split the secondary turn in two or more segments and connect the electrodes 4 (one set) to the adjoining ends of the secondary segments so that, where the secondary is split into segments shown at 5 in Fig. 3, four electrodes will be served by one transformer secondary turn. If the turn is split in thirds, then six electrodes would be served by one turn.

The electrodes are in series with the work so that each pair of electrodes forms two spot welds. Of course, the electrodes could be arranged in pairs one on each side of the work but they would only produce one spot for each pair of electrodes. By a back-up electrode and a pair of electrodes being located in spaced relation to each other, a series weld is afforded and there is less scarring of the metal and more welds can be afforded by each transformer.

Where there are a large number of electrodes as, for instance, in welding an automobile door, something like forty-eight are used, or a floor pan where there may be upwards of a hundred or more, quite a problem arises in the space that is available to provide the number of transformers of the customary construction which will be required to take care of the electrodes. Furthermore, there is the problem of the cost of the transformers and also the amount of power that will be used. As a matter of fact, only a small amount of the power that comes into the primary of a transformer is actually utilized at the electrodes. A great part of the energy is lost in the transformer and in the welding cables.

I find, therefore, when I split the transformer secondary turns into segments and connect more electrodes, double or triple, etc., that the additional amount of power used is nowhere near double or the equivalent multiple of the power used with a single secondary turn. In fact, the increase of the amount of power utilized is only a small fraction and this is wholly due to the additional welds and a slightly greater length of cable required to make the added connections in the transformer secondary segments.

If the transformers are properly placed and properly connected at the split ends, the cables may not be much, if any, longer than where only two electrodes are connected with a single secondary turn. The added length of cable is simply due to the addition of electrodes connected with the secondary. The large loss of energy in the transformer is not repeated for each additional pair of electrodes added. In fact, I believe that there is practically no more loss in the transformer than there would be with the customary number of electrodes that are connected with it where whole turns are used. So, there is a large saving in the energy that is put into the transformer, the primary drawing only the additional energy needed for the extra weld and the extra link of cable. A welding transformer is expensive and, consequently, there is a large saving in initial cost by doubling or multiplying the number of electrodes that can be had on one transformer. The machine construction is very much simplified by being able to use less transformers for a given number of electrodes.

I claim:

1. In an electrical energy distribution system, the combination of a plurality of load devices and a transformer serving the devices having a primary circuit and having a secondary divided into fractional turns and a set of companion devices connected to the adjoining ends of the fractional turns at each split.

2. In an electrical energy distribution system, the combination of a plurality of load devices, a transformer with a secondary divided into a plurality of turns, each turn split into fractional turns, plural pairs of load devices being connected to each secondary turn, one pair of load devices included in each fractional turn and a single primary in inductive relation with all of said fractional turns.

ROBERT SCHIFF.